United States Patent
Jeong et al.

(10) Patent No.: US 8,786,819 B2
(45) Date of Patent: Jul. 22, 2014

(54) PLASTIC FLAT DISPLAY AND METHOD FOR MANUFACTURING SAME

(75) Inventors: Seok-Hong Jeong, Gyeonggi-do (KR); Hyun-Ha Hwang, Seoul (KR)

(73) Assignee: Intellectual Discovery Co., Ltd, Seoul (KR)

( * ) Notice: Subject to any disclaimer, the term of this patent is extended or adjusted under 35 U.S.C. 154(b) by 673 days.

(21) Appl. No.: 12/161,498

(22) PCT Filed: Jan. 19, 2007

(86) PCT No.: PCT/KR2007/000314
§ 371 (c)(1),
(2), (4) Date: Jul. 18, 2008

(87) PCT Pub. No.: WO2007/083938
PCT Pub. Date: Jul. 26, 2007

(65) Prior Publication Data
US 2010/0195042 A1 Aug. 5, 2010

(30) Foreign Application Priority Data
Jan. 20, 2006 (KR) .......... 10-2006-0006183

(51) Int. Cl.
*G02F 1/1333* (2006.01)
*G02F 1/1345* (2006.01)
*G02F 1/1343* (2006.01)

(52) U.S. Cl.
USPC ............ 349/158; 349/139; 349/150

(58) Field of Classification Search
CPC ........... G02F 1/133305; G02F 1/1333; G02F 1/1339; G02F 1/13392; G02F 1/13439; G02F 1/1334; H01J 9/20

USPC .......... 349/158, 153, 187–190, 48, 139, 150; 345/87–107
See application file for complete search history.

(56) References Cited

U.S. PATENT DOCUMENTS 4,192,060 A 3/1980 Washizuka et al.
4,526,818 A 7/1985 Hoshikawa et al.
(Continued)

FOREIGN PATENT DOCUMENTS

EP 1335211 A2 8/2003
JP 60097325 A1 5/1985
(Continued)

OTHER PUBLICATIONS

Birendra Bahadur, Liquid Crystals Applications and Uses 1990, World Scientific, vol. 1, p. 187.*

(Continued)

*Primary Examiner* — Edward Glick
*Assistant Examiner* — David Chung
(74) *Attorney, Agent, or Firm* — Amin, Turocy & Watson, LLP (57) ABSTRACT

The present invention provides a plastic flat display and a method for manufacturing the same. In a plastic flat display including upper and lower substrates, the lower substrate is formed of an FPCB substrate for supplying an electrical signal to the plastic flat display. Accordingly, a flexible printed circuit board (FPCB) is used in an integrated type to serve as a lower substrate film of the flat display, so that an additional lower substrate is not necessary and the flat display can be implemented with a simple structure, and a method for manufacturing the plastic flat display.

2 Claims, 10 Drawing Sheets

(56) References Cited

U.S. PATENT DOCUMENTS

| | | | |
|---|---|---|---|
| 5,852,487 A * | 12/1998 | Fujimori et al. | 349/162 |
| 6,886,751 B2 | 5/2005 | Silverbrook | |
| 7,375,789 B2 * | 5/2008 | Mizuyoshi | 349/155 |
| 2002/0180344 A1 | 12/2002 | Lichtfuss | |
| 2004/0159710 A1 | 8/2004 | Silverbrook | |
| 2004/0179165 A1 * | 9/2004 | Kinoshita et al. | 349/158 |
| 2004/0232853 A1 * | 11/2004 | Hur et al. | 315/291 |
| 2004/0233375 A1 * | 11/2004 | Chung et al. | 349/153 |
| 2005/0134554 A1 | 6/2005 | Albert et al. | |
| 2005/0139684 A1 | 6/2005 | Silverbrook | |
| 2006/0061541 A1 | 3/2006 | Ou et al. | |
| 2006/0146271 A1 * | 7/2006 | Pennaz et al. | 349/182 |
| 2006/0262260 A1 * | 11/2006 | Majumdar et al. | 349/122 |
| 2007/0008465 A1 * | 1/2007 | Ding et al. | 349/113 |
| 2007/0063939 A1 * | 3/2007 | Bellamy | 345/87 |

FOREIGN PATENT DOCUMENTS

| | | |
|---|---|---|
| JP | 05-011709 | 1/1993 |
| JP | 11-337918 | 12/1999 |
| JP | 2000-105392 | 4/2000 |
| JP | 20022014369 A | 1/2002 |
| JP | 3427729 | 5/2003 |
| JP | 2005-017567 | 1/2005 |
| JP | 2005-338275 | 12/2005 |
| JP | 2006-113436 | 4/2006 |
| KR | 1020030001756 A | 1/2003 |
| KR | 1020050121887 A | 12/2005 |
| WO | 2005045509 | 5/2005 |

OTHER PUBLICATIONS

Phang Kien Yip, "Plastic LCD With Gratings as a Backlit Display Panel", Motorola Technical Developments, Motorola Inc., Schaumburg, IL, US. vol. 32, Sep. 1997, pp. 137-138, XP000741161 ISSN 0887-5286.

Japanese Office Action for Japanese Application No. 2008-551190 dated Dec. 14, 2010.

Japanese Office Action for Japanese Application No. 2008-551190 dated Jan. 17, 2012.

Japanese Office Action for Japanese Application No. 2008-551190 dated Aug. 2, 2012.

* cited by examiner

(Conventional structure)

(Upper, lower substrate: plastic ITO substrate + FPCB)

(Structure of the present invention)
(FPCB integrated type plastic LCD)

( Upper substrate: plastic ITO substrate, lower substrate: FPCB)

PLASTIC FLAT DISPLAY AND METHOD FOR MANUFACTURING SAME

CROSS-REFERENCE TO RELATED APPLICATIONS

This application is a U.S. national phase of International Application No. PCT/KR2007/000314 filed Jan. 19, 2007 which claims the benefit of priority to Korean Patent Application No. 10-2006-0006183 filed Jan. 20, 2006 which is hereby incorporated by reference in its entirety.

TECHNICAL FIELD

The present invention relates to a plastic flat display and a method for manufacturing the same, and more particularly, to a plastic flat display, wherein a flexible printed circuit board (FPCB) is used in an integrated type to serve as a lower substrate film of the flat display, so that an additional lower substrate is not necessary and the flat display can be implemented with a simple structure, and a method for manufacturing the plastic flat display.

BACKGROUND ART

In general, a plastic flat display is applied to an LCD (Liquid Crystal Display), an organic EL (Electro Luminescent) display, an electronic ink and the like.

Figure 1:
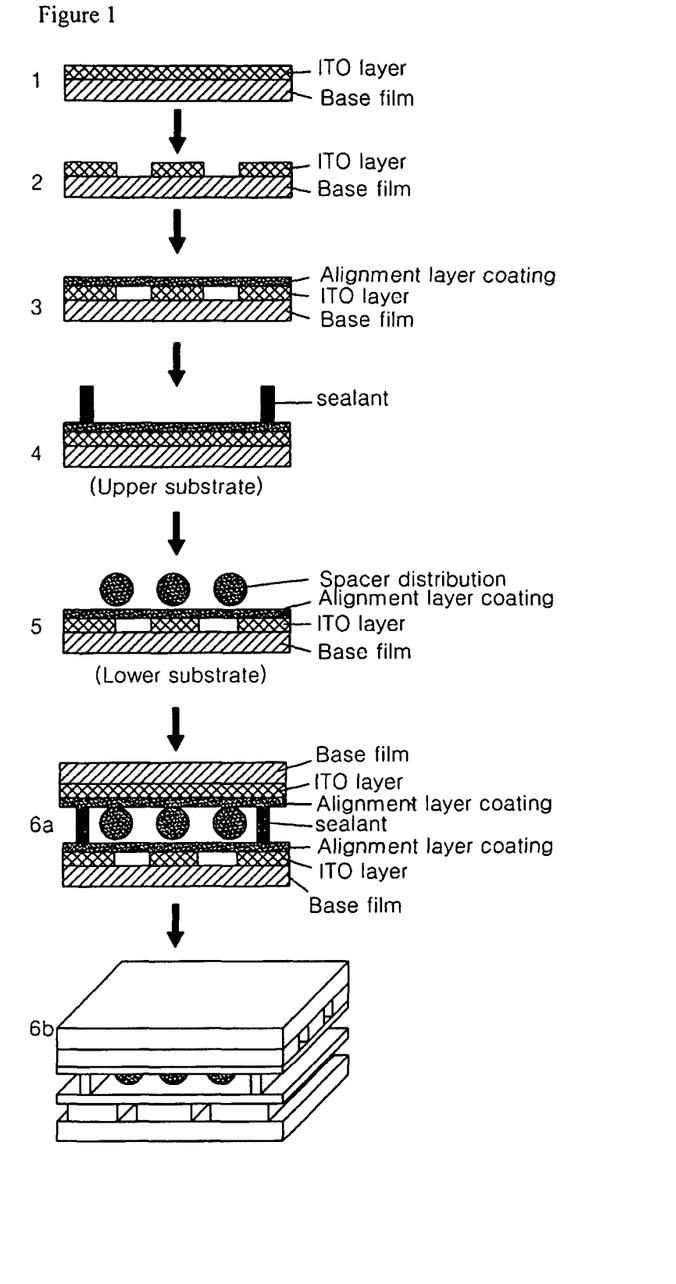
FIG. 1 is a sequential process view illustrating a conventional plastic liquid crystal display and a method for manufacturing the same.

FIG. 1 is a sequential process view illustrating a conventional plastic liquid crystal display and a method for manufacturing the same.

The method for manufacturing the conventional plastic liquid crystal display as illustrated in FIG. 1 will be described below.

1. Upper and lower transparent ITO (Indium Tin Oxide) film layers are bonded to base films, respectively.
2. The upper and lower ITO film substrates are patterned (photolithography process).
3. An alignment layer is coated on each of the upper and lower ITO film electrode substrates.
4. A thermosetting sealant is printed on one substrate (the upper substrate).
5. Spacers are distributed on the other substrate (the lower substrate).
6a. The one substrate (the upper substrate) and the other substrate (the lower substrate) are aligned with and assembled to each other through thermal pressing.
6b. Liquid crystals are injected under a vacuum condition into a space between the one substrate (the upper substrate) and the other substrate (the lower substrate).

Figure 2:
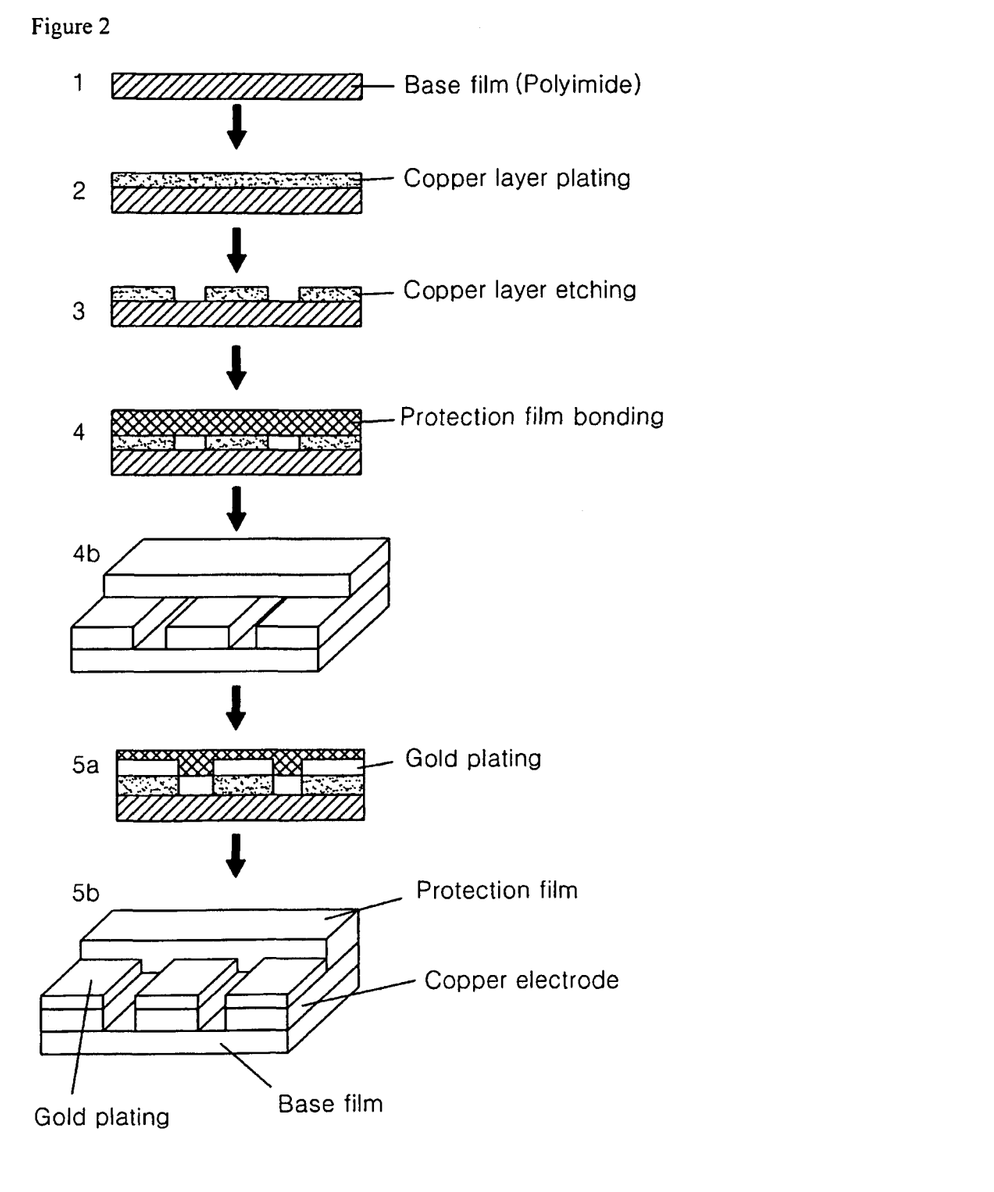
FIG. 2 is a sequential process view illustrating a conventional flexible printed circuit board (FPCB) and a method for manufacturing the same.

FIG. 2 is a sequential process view illustrating a conventional flexible printed circuit board (FPCB) and a method for manufacturing the same.

The method for manufacturing the conventional flexible printed circuit board as illustrated in FIG. 2 will be described below.

1. A base film made of a material such as polyimide is prepared.
2. A thin copper layer is plated on the base film.
3. The plated copper layer is etched through a photolithography technique to form an electrode pattern.
4a. A protection film is bonded through thermal pressing. Here, 4b of FIG. 2 is a perspective view of 4a.
5a. To prevent a copper surface exposed in a region without the protection film from being oxidized, surface treatment such as electroless gold plating or electroless silver plating is performed to form a protection film. Here, 5b of FIG. 2 is a perspective view of 5a.

Figure 3:
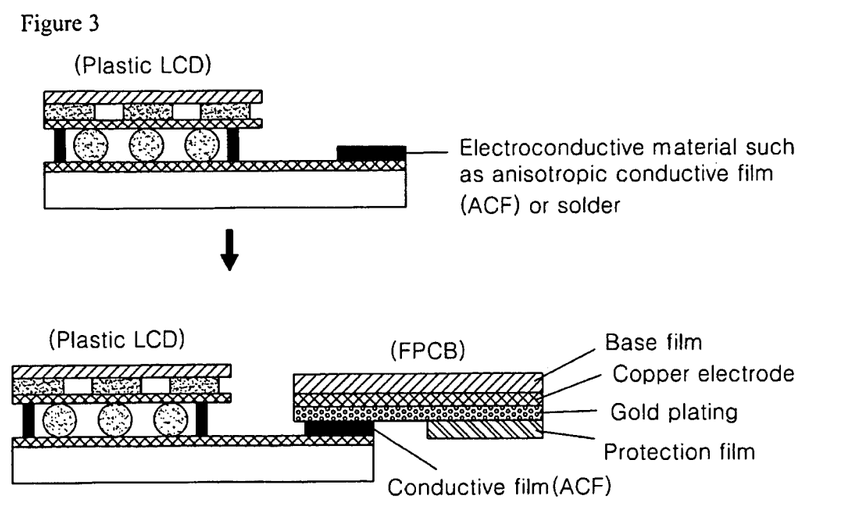
FIG. 3 is a sectional view illustrating a bonding process of the conventional plastic liquid crystal display and flexible printed circuit board.

FIG. 3 is a sectional view illustrating a bonding process of the conventional plastic liquid crystal display and flexible printed circuit board.

The bonding process illustrated in FIG. 3 will be described below.

1. An electroconductive material, such as solder or an anisotropic conductive film (ACF), is bonded on a pad electrode portion of a plastic LCD to be bonded to a FPCB.
2. The FPCB and the plastic LCD are aligned with each other and thermally pressed to each other.

Figure 4:
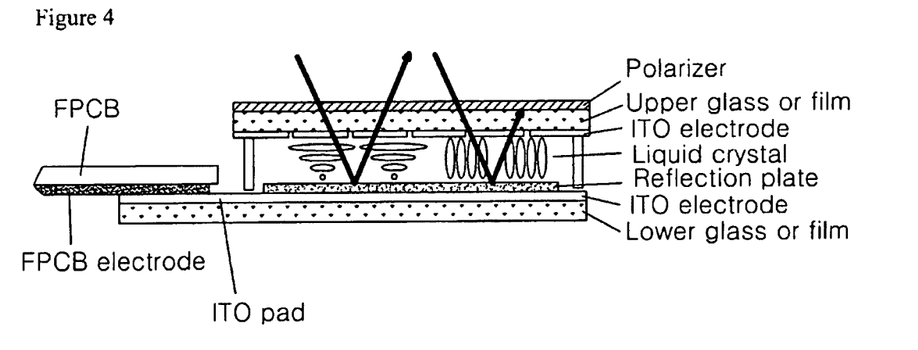
FIG. 4 is a side view showing the structure of a conventional reflective LCD.
Figure 5:
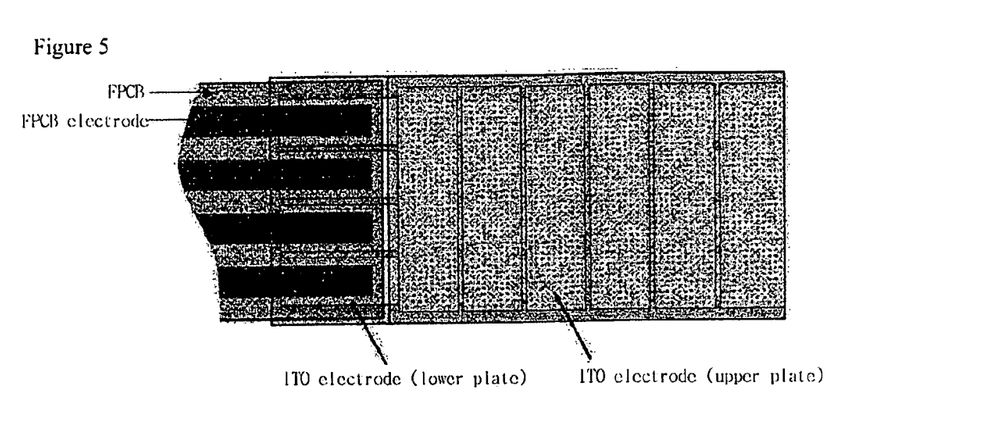
FIG. 5 is a plan view showing the structure of the conventional reflective LCD of FIG. 4.

FIG. 4 is a side view showing the structure of a conventional reflective LCD, and FIG. 5 is a plan view showing the structure of the conventional reflective LCD of FIG. 4.

The structure and principle of the conventional reflective LCD will be described as follows:

1. Structure

The conventional reflective LCD comprises an upper ITO electrode substrate with a polarizer attached thereto and a lower ITO electrode substrate with an inner reflection layer (or an external reflection film). The conventional reflective LCD has a structure in which the two substrates are bonded to face each other, and liquid crystals are interposed between the upper and lower ITO electrode substrates.

2. Principle

An ITO pad portion of an ITO electrode, which is exposed out of an LCD cell, and an electrode portion of a FPCB (Flexible Printed Circuit Board) are bonded to be electrically conducted to each other. Accordingly, an external electrical signal is transmitted to the upper and lower substrates of an LCD through the FPCB, and liquid crystals are reacted in accordance with a change in an electric field between the upper and lower substrates, which is generated by the external electrical signal, so that the amount of light emitted while being reflected on a reflection plate can be adjusted.

However, such a conventional reflective LCD has problems as follows:

First, since costs of the upper and lower ITO electrode substrates have a very high fraction in costs of the LCD, there is a problem in that manufacturing costs increase due to the upper and lower substrates.

Further, there are other problems in that a percentage defective increases and manufacturing costs also increase due to the complicated processes in which an LCD cell is manufactured using the upper and lower ITO electrode substrates and the FPCB is then bonded to the ITO pad electrode by aligning them with each other.

Figure 6:
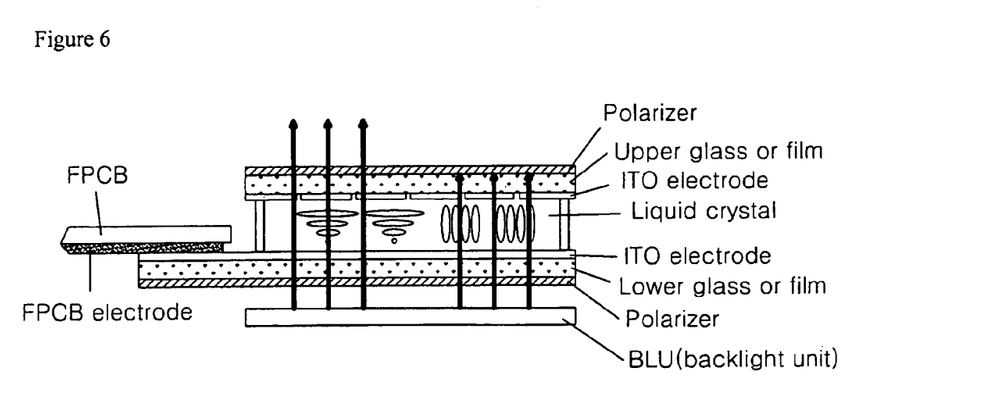
FIG. 6 is a side view showing the structure of a conventional transmissive LCD.
Figure 7:
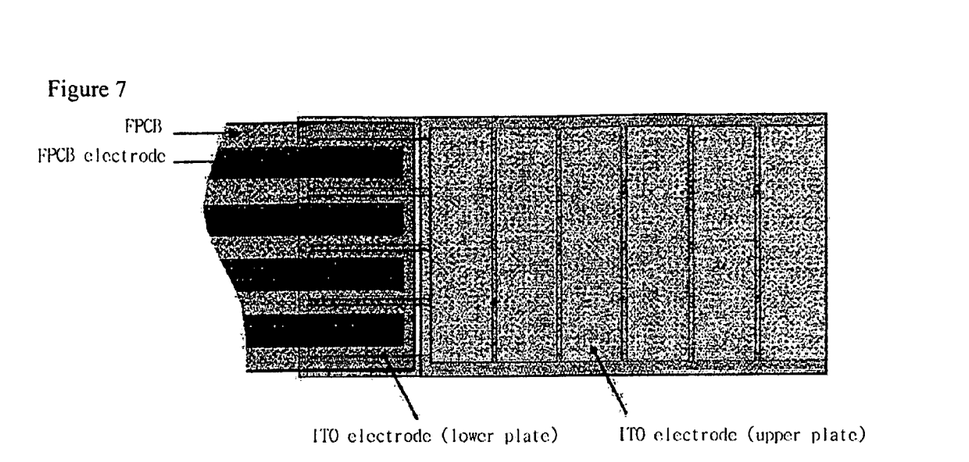
FIG. 7 is a plan view showing the structure of the conventional transmissive LCD of FIG. 6.

FIG. 6 is a side view showing the structure of a conventional transmissive LCD, and FIG. 7 is a plan view showing the structure of the conventional transmissive LCD of FIG. 6.

The structure and principle of the conventional transmissive LCD will be described as follows:

1. Structure

The conventional transmissive LCD comprises upper and lower ITO electrode substrates each of which has a polarizer attached thereto. The conventional transmissive LCD has a structure in which the two substrates are bonded to face each other and liquid crystals are interposed between the upper and lower ITO electrode substrates A BLU (Back Light Unit) serving as a light source is positioned below the lower ITO electrode substrate.

2. Principle

An ITO pad portion of an ITO electrode, which is exposed out of an LCD cell, and an electrode portion of a FPCB are bonded to be electrically conducted to each other. Accordingly, an external electrical signal is transmitted to the upper and lower substrates of an LCD, and liquid crystals are reacted in accordance with a change in an electric field between the upper and lower substrates, which is formed by the external electrical signal, so that the amount of light emitted from the BLU can be adjusted.

However, such a conventional transmissive LCD has problems as follows:

First, since costs of the upper and lower ITO electrode substrates have a very high fraction in costs of the LCD, there is a problem in that manufacturing costs increase.

Further, there are other problems in that a percentage defective increases and manufacturing costs also increase due to the complicated processes in which an LCD cell is manufactured using the upper and lower ITO electrode substrates and the FPCB is then bonded to the ITO pad by aligning them with each other.

Figure 8:
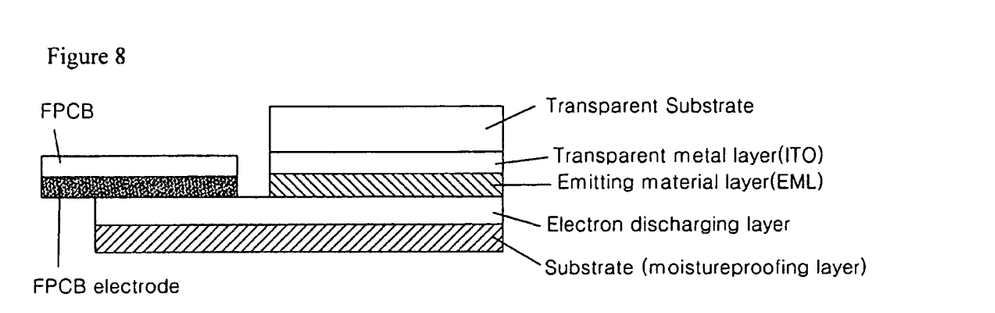
FIG. 8 is a sectional view conceptually showing a conventional organic EL display.

FIG. 8 is a sectional view conceptually showing a conventional organic EL display.

The structure and principle of the conventional organic EL display will be described as follows:

1. Structure

A single-layer EL device has a structure of electrode/emitting material layer/electrode. Ca, Mg, Al or the like, which has a small work function, is used for a cathode that is an electron injection electrode.

An anode is a hole injection electrode. A transparent metal oxide with a high work function is used for the anode so that emitted light can be radiated out of the device. ITO (Indium Tin Oxide) is most widely used for the hole injection electrode, and the thickness of the ITO is about 30 nm.

Glass is generally used for a substrate. The material of the emitting material layer (EML) includes a single molecule organic EL such as Alq3 or Anthracene, PPV (poly(p-phenylenevinylene)), PT (polythiophene) and the like, and polymeric organic EL materials that are derivatives thereof.

Further, an FPCB is positioned on a top surface of an electron emitting layer.

2. Principle

When power is supplied to the organic EL display, a current flows while electrons are moved. In a cathode, electrons are moved to the emitting material layer by an assistance of an electron transmission layer, whereas in an anode, holes (the concept of positive(+) and a state where electrons escape) are moved to the emitting material layer by an assistance of a hole transmission layer. Further, electrons and holes, which are combined in the emitting material layer made of an organic material, produce excitons with high energy. At this time, light is emitted while the excitons hop to a lower energy level.

However, such a conventional organic EL display has a problem as follows:

First, there are problems in that a percentage defective increases and manufacturing costs also increase due to the complicated processes in which a single-layer EL device is manufactured and an FPCB is bonded thereto.

DISCLOSURE OF INVENTION

Technical Problem

Accordingly, the present invention is conceived to solve the aforementioned problems in the prior art. An object of the present invention is to provide a plastic flat display, wherein a flexible printed circuit board is used in an integrated type to serve as a lower substrate film of the flat display, so that an additional lower substrate is not necessary and the flat display can be implemented with a simple structure, and a method for manufacturing the plastic flat display.

Technical Solution

According to an aspect of the present invention for achieving the object, there is provided a plastic flat display including upper and lower substrates, wherein the lower substrate is formed of an FPCB substrate for supplying an electrical signal to the plastic flat display.

According to another aspect of the present invention for achieving the object, there is provided a method for manufacturing a plastic flat display, comprising a first process of preparing an upper ITO film substrate by bonding a transparent ITO film substrate on a base film, and preparing a lower FPCB substrate; a second process of patterning the upper ITO film substrate after the first process; a third process of printing alignment layers on the upper ITO film substrate and the lower FPCB substrate after the second process; a fourth process of printing a thermosetting sealant on the upper ITO film substrate and distributing spacers on the lower FPCB substrate after the third process; a fifth process of aligning and coupling the upper ITO film substrate and the lower FPCB substrate with each other through thermal pressing after the fourth process; and a sixth process of injecting liquid crystals under a vacuum condition into a space between the upper ITO film substrate and the lower FPCB substrate after the fifth process.

MODE FOR THE INVENTION

Hereinafter, embodiments of a plastic flat display and a method for manufacturing the same according to the technical spirit of the present invention will be described with reference to the accompanying drawings.

Figure 9:
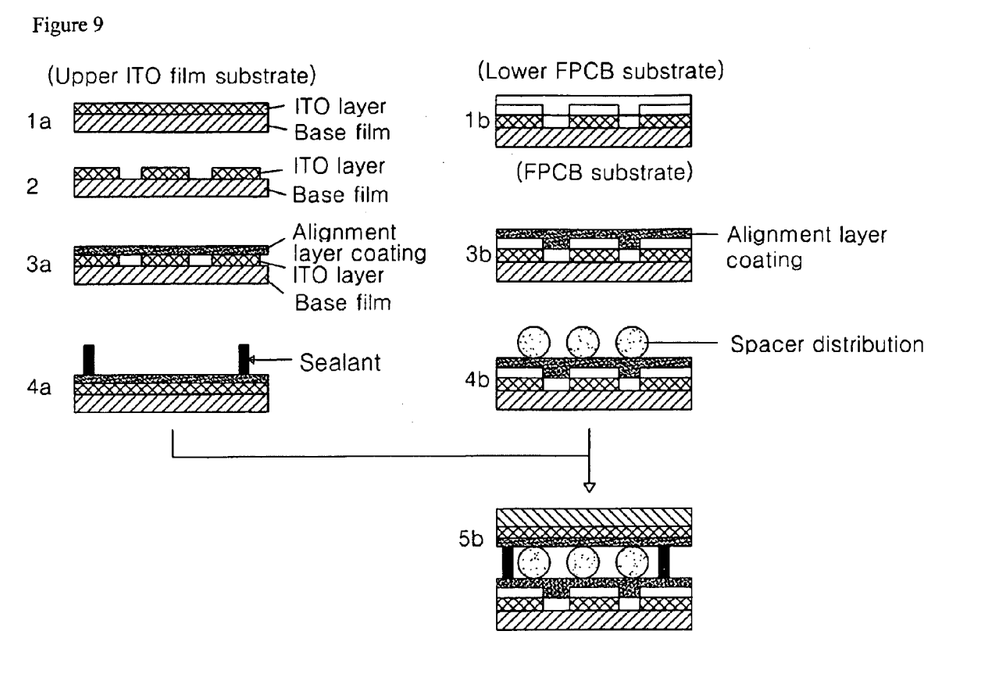
FIG. 9 is a sequential process view illustrating a plastic flat display and a method for manufacturing the same according to an embodiment of the present invention.
Figure 10:
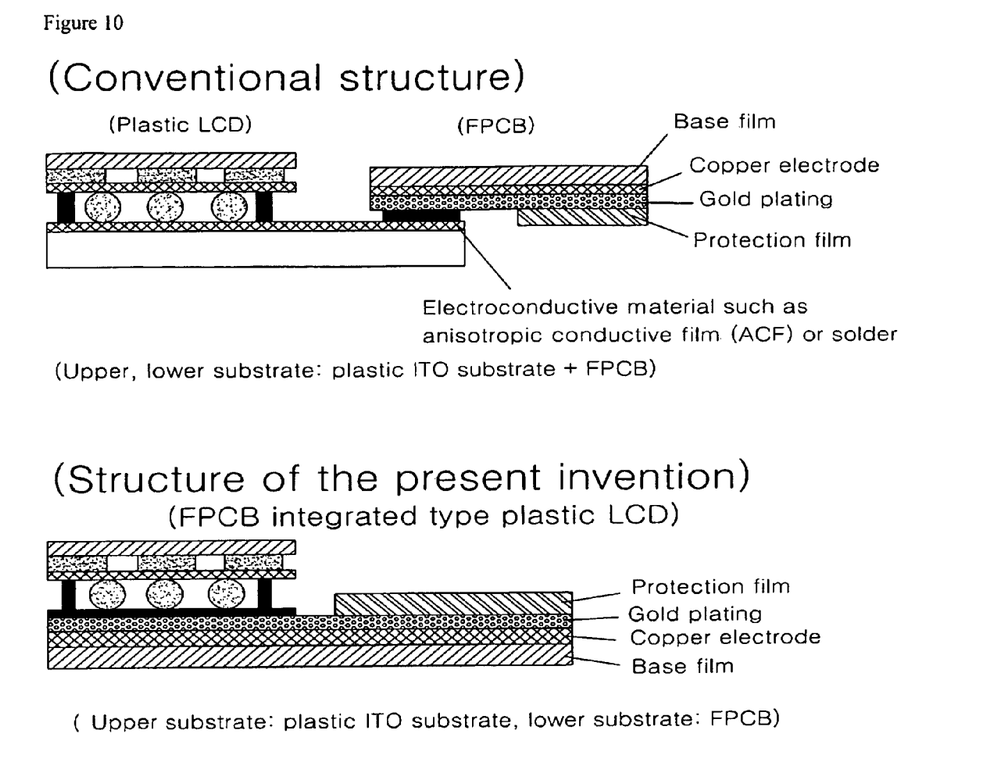
FIG. 10 is a sectional view comparing the structure of a prior art with that of the present invention.

FIG. 9 is a sequential process view illustrating a plastic flat display and a method for manufacturing the same according to an embodiment of the present invention, and FIG. 10 is a sectional view comparing the structure of a prior art with that of the present invention.

As shown in these figures, the plastic flat display includes upper and lower substrates, wherein the lower substrate is formed of an FPCB substrate for supplying an electrical signal to the plastic flat display.

The FPCB substrate comprises an electrode serving as a reflection plate for reflecting external light.

The FPCB substrate has a base film, and the base film is made of one or more of polyethyleneterephtalate (PET) and polypropylene (PP).

The plastic flat display is applied to one or more of a liquid crystal display, an organic EL display and an electronic ink.

A method for manufacturing the plastic flat display comprises a first process 1a and 1b of preparing an upper ITO film substrate by bonding a transparent ITO film substrate on a base film, and preparing a lower FPCB substrate; a second process 2 of patterning the upper ITO film substrate after the first process; a third process 3a and 3b of printing alignment layers on the upper ITO film substrate and the lower FPCB substrate after the second process; a fourth process 4a and 4b of printing a thermosetting sealant on the upper ITO film substrate and distributing spacers on the lower FPCB substrate after the third process; a fifth process 5b of aligning and coupling the upper ITO film substrate and the lower FPCB substrate with each other through thermal pressing after the fourth process; and a sixth process of injecting liquid crystals under a vacuum condition into a space between the upper ITO film substrate and the lower FPCB substrate after the fifth process.

The third process comprises printing an alignment layer on a gold-plated region exposed in the lower FPCB substrate by means of coating.

Figure 11:
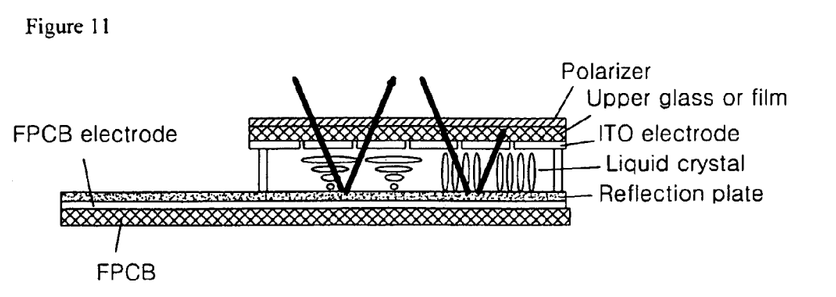
FIG. 11 is a side view showing an example in which a reflective LCD is constructed according to FIG. 9.
Figure 12:
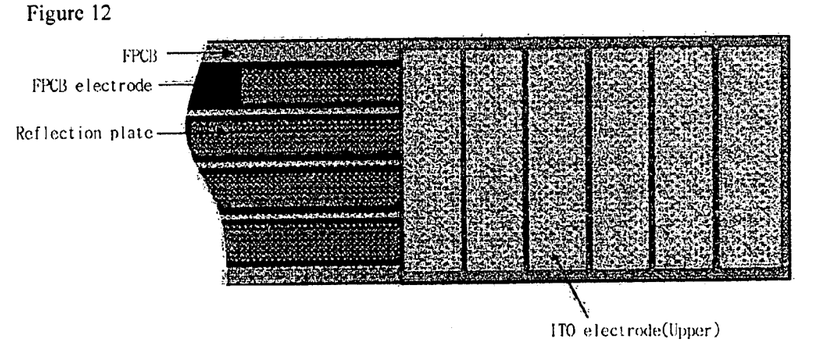
FIG. 12 is a plan view showing the structure of the reflective LCD of FIG. 11.

FIG. 11 is a side view showing an example in which a reflective LCD is constructed according to FIG. 9, and FIG. 12 is a plan view showing the structure of the reflective LCD of FIG. 11.

As shown in these figures, the plastic flat display for constructing a reflective LCD comprises an upper ITO electrode substrate with a polarizer attached thereto; a lower FPCB electrode substrate with an inner reflection layer; and liquid crystals interposed between the upper ITO electrode substrate and the lower FPCB electrode substrate.

The lower FPCB electrode substrate includes an electrode made of copper, and surface treatment is performed using an electroless silver plating technique to prevent oxidation of the copper.

Figure 13:
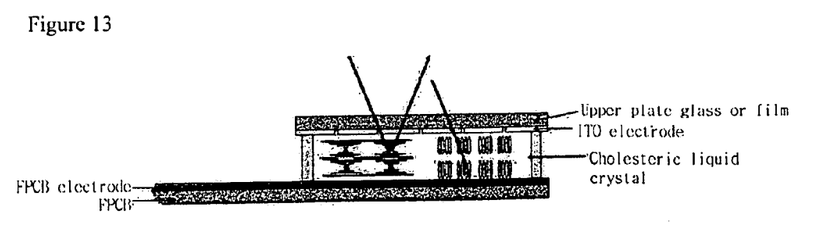
FIG. 13 is a sectional view showing an example in which a cholesteric LCD is constructed according to FIG. 9.

FIG. 13 is a sectional view showing an example in which a cholesteric LCD is constructed according to FIG. 9.

As shown in this figure, the plastic flat display for constructing a cholesteric LCD comprises an upper ITO electrode substrate; a lower FPCB electrode substrate with an inner reflection layer; and cholesteric liquid crystals interposed between the upper ITO electrode substrate and the lower FPCB electrode substrate.

A plastic flat display for constructing a guest-host LCD comprises an upper ITO electrode substrate; a lower FPCB electrode substrate with an inner reflection layer; and liquid crystals interposed between the upper ITO electrode substrate and the lower FPCB electrode substrate and having a dichroic dye mixed therein.

Figure 14:
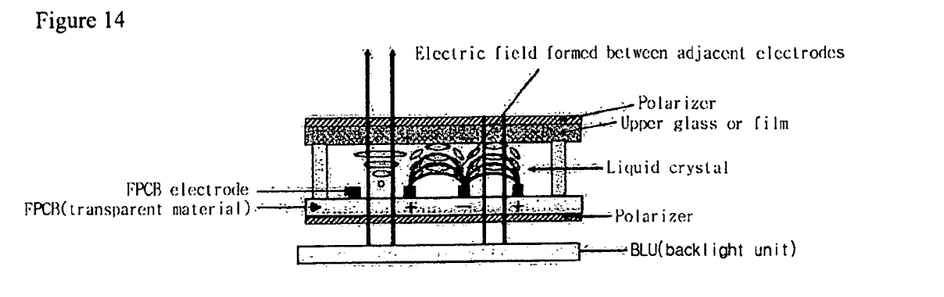
FIG. 14 is a sectional view showing an example in which a transmissive LCD is constructed according to FIG. 9.
Figure 15:
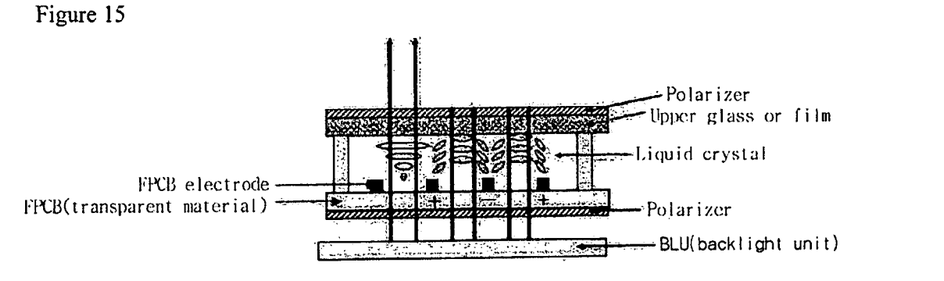
FIG. 15 is a front view of the transmissive LCD of FIG. 14.
Figure 16:
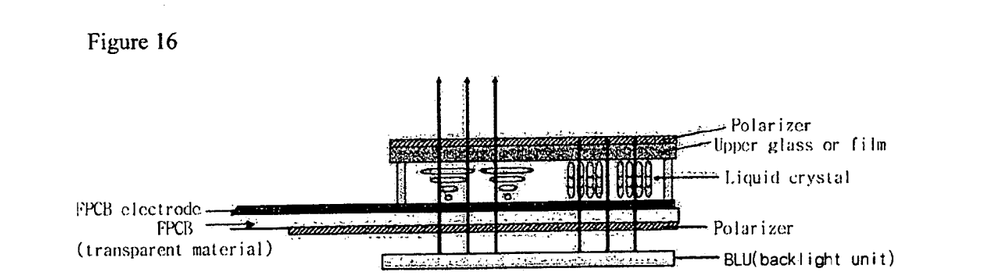
FIG. 16 is a side view of the transmissive LCD of FIG. 14.
Figure 17:
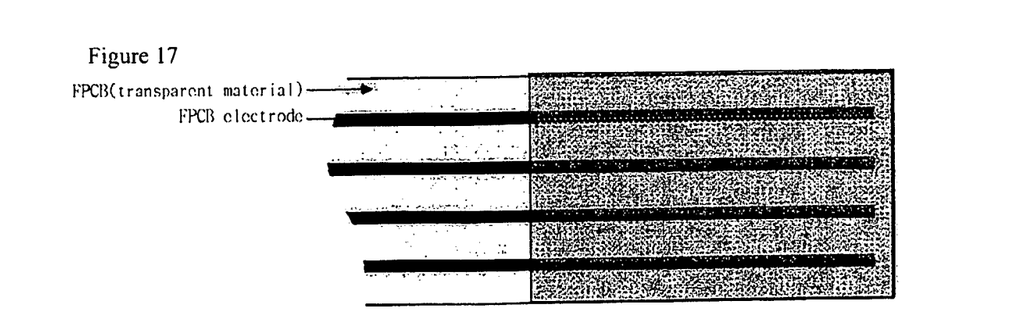
FIG. 17 is a plan view of the transmissive LCD of FIG. 14.

FIG. 14 is a sectional view showing an example in which a transmissive LCD is constructed according to FIG. 9, FIG. 15 is a front view of the transmissive LCD of FIG. 14, FIG. 16 is a side view of the transmissive LCD of FIG. 14, and FIG. 17 is a plan view of the transmissive LCD of FIG. 14.

As shown in these figures, the plastic flat display for constructing a transmissive LCD comprises an upper ITO electrode substrate with a polarizer attached thereto; a lower FPCB electrode substrate with an inner reflection layer and with a base film made of polyethyleneterephtalate (PET) or polypropylene (PP); and liquid crystals interposed between the upper ITO electrode substrate and the lower FPCB electrode substrate.

The states of the liquid crystals are controlled by means of an IPS (In-Plane Switching) or FFS (Fringe-Field Switching) liquid crystal driving method.

Figure 18:
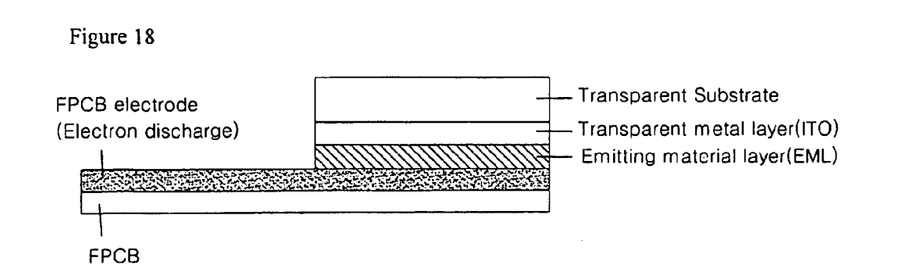
FIG. 18 is a sectional view showing an example in which an organic EL display is constructed according to FIG. 9.

FIG. 18 is a sectional view showing an example in which an organic EL display is constructed according to FIG. 9.

As shown in this figure, the plastic flat display for constructing an organic EL display comprises an upper substrate having an ITO electrode and an emitting material layer; and a lower FPCB electrode substrate positioned below the upper substrate and having an FPCB electrode for discharging electrons.

Figure 19:
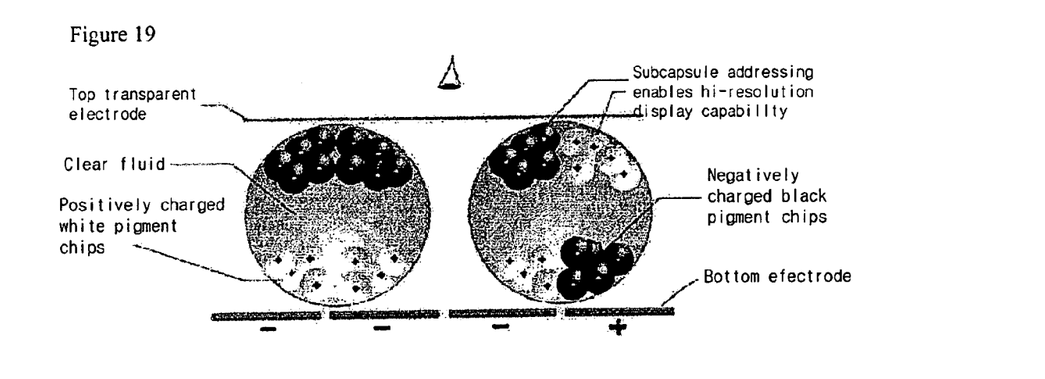
FIG. 19 is a view conceptually illustrating an example in which an electronic ink is constructed according to FIG. 9.

FIG. 19 is a view conceptually illustrating an example in which an electronic ink is constructed according to FIG. 9.

As shown in this figure, the plastic flat display for constructing an electronic ink comprises an upper transparent electrode substrate; a lower FPCB electrode substrate; and encapsulated particles respectively charged with negative and positive electric charges between the upper transparent electrode substrate and the lower FPCB electrode substrate.

The plastic flat displays constructed as described above and the methods for manufacturing the plastic flat displays according to the present invention will be described in greater detail below with reference to the accompanying drawings.

First, the present invention intends to provide a plastic flat display, wherein a flexible printed circuit board is used in an integrated type to serve as a lower substrate film of the flat display, so that an additional lower substrate is not necessary and the flat display can be implemented with a simple structure.

FIG. 9 is a sequential process view illustrating a plastic flat display and a method for manufacturing the same according to an embodiment of the present invention.

The method for manufacturing the plastic flat display according to the present invention will be described below.

First, an upper ITO film substrate is manufactured as follows:

1a. An upper ITO film substrate is prepared by bonding a transparent ITO film layer on a base film.

2. The upper ITO film substrate is patterned.

3a. An alignment layer is printed on the upper ITO film substrate.

4a. A thermosetting sealant is printed on the upper ITO film substrate.

Further, a lower FPCB substrate is manufactured as follows:

1b. A lower FPCB is also prepared.

3b. An alignment layer is printed on the lower FPCB substrate. At this time, the alignment layer is printed by performing coating on a gold-plated region exposed in the lower FPCB substrate.

4b. Spacers are distributed on the lower FPCB substrate.

Then, a plastic flat display is manufactured as follows:

5b. The upper ITO film substrate and the lower FPCB substrate are aligned and coupled with each other through thermal pressing. Further, liquid crystals are injected under a vacuum condition into a space between the upper ITO film substrate and the lower FPCB substrate, thereby completing a plastic flat display.

FIG. 10 is a sectional view comparing the structure of a prior art with that of the present invention.

It can be seen that the prior art and the present invention are different from each other in that both upper and lower substrates are formed of plastic ITO substrates and an FPCB is coupled to one of the substrates in the prior art, whereas upper and lower substrates are formed of a plastic ITO substrate and an FPCB, respectively, in the present invention.

FIG. 11 is a side view showing an example in which a reflective LCD is constructed according to FIG. 9, and FIG. 12 is a plan view showing the structure of the reflective LCD of FIG. 11.

The structure and principle of the reflective LCD constructed according to the present invention will be described as follows:

1. Structure

The reflective LCD has a structure in which an upper ITO electrode substrate with a polarizer attached thereto and a lower FPCB (or PCB) electrode substrate with an inner reflection layer are formed and liquid crystals are interposed between the two substrates facing each other.

2. Principle

An electrical signal is transmitted to the upper ITO electrode substrate and the lower FPCB electrode substrate of the LCD through an electrode portion of the FPCB, which is exposed out of an LCD cell, and the liquid crystals are reacted in accordance with a change in an electric field between the upper and lower substrates, which is generated by the electrical signal, so that the amount of light emitted while being reflected on a reflection plate can be adjusted.

Accordingly, there are the following advantages:

That is, since an inexpensive FPCB is used instead of an expensive ITO electrode substrate as a lower substrate of an LCD cell, manufacturing costs can be reduced.

Further, since an FPCB substrate for transmitting an electric signal is used as a lower substrate of an LCD, a conventional process of aligning and coupling a lower ITO substrate and an FPCB substrate with each other is not required, resulting in simplification of a manufacturing process.

Furthermore, since an FPCB electrode itself may serve as a reflection plate, a reflection plate is not needed. That is, the component of the FPCB electrode is copper, and an electroless silver plating technique of various surface treatment techniques may be used for preventing oxidation of copper. If such an electroless silver plating technique is used, an additional reflection plate is not required.

FIG. 13 is a sectional view showing an example in which a cholesteric LCD is constructed according to FIG. 9.

Here, since a cholesteric LCD, a PSCT (Polymer Stabilized Cholesteric Texture) LCD, a guest-host LCD or the like allows light to be reflected on a liquid crystal layer itself in accordance with control of twist pitches of liquid crystals, or controls light reflectivity by means of a dichroic dye mixed in the liquid crystals, a reflection plate is not required.

The cholesteric and PSCT LCDs refer to LCDs in which the twist pitches of liquid crystals are controlled to be suitable for a wavelength band (400 to 700 nm) of visible rays so that light with a specific wavelength can be reflected on a liquid crystal layer itself.

Furthermore, the guest-host LCD refers to an LCD in which a dichroic dye (guest) is mixed with liquid crystals (host) so that reflectivity or transmittance is controlled in accordance with a change in the alignment state of a liquid crystal layer due to a change in an electric field.

FIG. 14 is a sectional view showing an example in which a transmissive LCD is constructed according to FIG. 9, FIG. 15 is a front view of the transmissive LCD of FIG. 14, FIG. 16 is a side view of the transmissive LCD of FIG. 14, and FIG. 17 is a plan view of the transmissive LCD of FIG. 14.

The structure and principle of the transmissive LCD constructed according to the present invention will be described as follows:

1. Structure

The transmissive LCD comprises an upper substrate with a polarizer attached thereto and a lower FPCB electrode substrate with a polarizer attached thereto. The transmissive LCD has a structure in which liquid crystals are interposed between the two substrates in a state where the two substrates are bonded to face each other.

Further, a BLU (Back light Unit) serving as a light source is positioned below the lower substrate.

Furthermore, polyimide is generally used for a base film of an FPCB. Preferably, polyethyleneterephtalate (PET), polypropylene (PP) or the like having superior transparency is used to enhance light transmittance.

In addition, it is preferred that an electrode pattern of the FPCB be designed to be sufficiently narrow so that the amount of light radiated from the BLU below the FPCB can be sufficiently secured.

2. Principle

Preferably, an IPS (In-Phase Switching) or FFS (Fringe-Field Switching) liquid crystal driving method is used to control the states of the liquid crystals in a portion between electrode patterns of the FPCB (a portion through which light from the BLU passes).

Accordingly, an external electrical signal is transmitted to the lower FPCB electrode substrate, and the liquid crystals are reacted in accordance with a change in an electric field between left and right electrodes of the lower FPCB electrode substrate, which is generated by the external electrical signal, so that the amount of light emitted from the BLU can be adjusted.

Here, the IPS liquid crystal driving method is one of TFT (Thin-Film Transistor) liquid crystal display methods. The IPS method uses a principle in which upon application of a voltage, light is emitted when liquid crystal molecules are rotated in parallel with a substrate. Accordingly, the IPS method greatly improves a viewing angle characteristic that was a disadvantage of a liquid crystal panel, so that natural images can be enjoyed at an angle of 170 degrees from respective top, bottom, left and right sides.

Further, the FFS (Fringe-Field Switching) liquid crystal driving method refers to a liquid crystal driving method in which + and − signals are applied to laterally adjacent electrodes so that liquid crystals are arranged along the adjacent electrodes contrary to an electric field driving method between upper and lower electrodes, which is a general LCD driving method.

In the LCD constructed in such a manner, there are the following advantages:

Since an electrode is not required in the upper substrate and an inexpensive FPCB is used instead of an expensive ITO electrode substrate as the lower substrate, manufacturing costs can be reduced.

Further, since an FPCB substrate for transmitting an electrical signal is directly used as the lower substrate of the LCD, there is an advantage in so that a conventional process of aligning a lower ITO substrate with an FPCB substrate is not required, resulting in simplification of a manufacturing process.

FIG. 18 is a sectional view showing an example in which an organic EL display is constructed according to FIG. 9.

The structure and principle of the organic EL display constructed according to the present invention will be described as follows:

1. Structure

A single-layer EL device has a structure of electrode/emitting material layer/electrode. Ca, Mg, Al or the like, which has a small work function, is used for a cathode that is an electron injection electrode.

An anode is a hole injection electrode. A transparent metal oxide with a high work function is used for the anode so that emitted light can be radiated out of the device. ITO is most widely used for a hole injection electrode, and the thickness of the ITO is about 30 nm.

Glass is generally used for a substrate. The material of the emitting material layer (EML) includes a single molecule organic EL such as Alq3 or Anthracene, PPV (poly(p-phenylenevinylene)), PT (polythiophene) and the like, and polymeric organic EL materials that are derivatives thereof.

Accordingly, the upper and lower substrates are formed of the ITO electrode and the emitting material layer, and the FPCB electrode, respectively.

2. Principle

When power is supplied to the organic EL display, a current flows while electrons are moved. In a cathode, electrons are moved to the emitting material layer by an assistance of an electron transmission layer, whereas in an anode, holes (the concept of positive(+) and a state where electrons escape) are moved to the emitting material layer by an assistance of a hole transmission layer. Further, electrons and holes, which are combined in the emitting material layer made of an organic material, produce excitons with high energy. At this time, light is emitted while the excitons hop to a lower energy level.

FIG. 19 is a view conceptually illustrating an example in which an electronic ink is constructed according to FIG. 9.

The structure and principle of the electronic ink is constructed according to the present invention will be described as follows:

1. Structure

A transparent electrode substrate and an FPCB electrode substrate are formed at top and bottom sides, respectively. Black particles charged with negative charges (−) and white particles charged with positive charges (+) are encapsulated together between the two substrates.

2. Principle

Display is achieved in such a manner that negative and positive electric charges mixed within each of capsules move to respective positions separated from each other according to the polarities of the substrate electrodes.

As such, according to the present invention, the flexible printed circuit board is used in an integrated type to serve as the lower substrate film of the flat display, so that an additional lower substrate is not necessary and the flat display can be implemented with a simple structure.

Although the preferred embodiments of the present invention have been described, the present invention may employ various modifications, changes and equivalents. It will be apparent that the present invention may be equally applied by appropriately modifying the embodiments. Accordingly, the descriptions are not intended to limit the scope of the present invention defined by the appended claims.

Industrial Applicability

As described above, in the plastic flat display and the method for manufacturing the same according to the present invention, there are advantages in that a flexible printed circuit board is used in an integrated type to serve as a lower substrate film of the flat display, so that an additional lower substrate is not necessary and the flat display can be implemented with a simple structure.

Here, a conventional transparent ITO film substrate is manufactured through a sputtering vacuum deposition technique. A surface resistance of 10 to 1kΩ/sq and a light transmittance of 85% or more are required in the transparent ITO film substrate. Since the method for depositing the transparent ITO film on a base film requires complicated techniques and conditions, the transparent ITO film substrate is a considerably expensive material. Therefore, according to the present invention, since an inexpensive FPCB that can be simply manufactured is used instead of such an ITO electrode substrate as a lower substrate of a plastic LCD cell, manufacturing costs of a plastic LCD can be reduced.

Further, a process of bonding an electroconductive material, such as solder or an anisotropic conductive film (ACF), to an LCD and an FPCB through thermal pressing is conventionally required in a process of aligning and coupling the LCD and FPCB with each other in an electrically conductive manner. However, the present invention has an advantage in that such a process can be omitted.

Furthermore, according to the present invention, since an FPCB substrate for transmitting an electrical signal is used as a lower substrate of an LCD, a conventional process of aligning a lower ITO substrate with an FPCB substrate is not required, resulting in simplification of a manufacturing process.

The invention claimed is:

1. A method for manufacturing a plastic flat display, comprising:
   a first process of preparing an upper indium tin oxide (ITO) film substrate by bonding a transparent ITO film substrate on a base film, and preparing a lower flexible printed circuit board (FPCB) electrode substrate;
   a second process of patterning the upper ITO film substrate after the first process;
   a third process of printing an alignment layer on the upper ITO film substrate;
   a fourth process of printing an alignment layer on the lower FPCB electrode substrate;
   a fifth process of printing a thermosetting sealant on the upper ITO film substrate and distributing spacers on the lower FPCB electrode substrate after the fourth process;
   a sixth process of aligning and coupling the upper ITO film substrate and the lower FPCB electrode substrate with each other through thermal pressing after the fifth process; and
   a seventh process of injecting liquid crystals under a vacuum condition into a space between the upper ITO film substrate and the lower FPCB electrode substrate after the sixth process,
   wherein the lower FPCB electrode substrate is an integrated type substrate for supplying an electrical signal to the plastic flat display,
   wherein the lower FPCB electrode substrate includes a base film, a copper electrode laminated on the base film, and a gold plating layer laminated on the copper electrode, and a protection film laminated on a part of a region of the gold plating layer, wherein the fourth process is performed by coating the alignment layer on the gold plating layer uncovered by the protection film in the lower FPCB electrode substrate, and wherein the sixth process is performed by aligning the alignment layer of the upper ITO film substrate and the alignment layer on the gold-plating layer of the lower FPCB.

2. A plastic flat display, comprising:

an upper transparent electrode substrate, which comprises a base film, an ITO layer laminated on the base film, an alignment layer coated on the ITO layer;

a lower FPCB electrode substrate, which comprises a base film, a copper electrode laminated on the base film, a gold plating layer laminated on the copper electrode, a protection film laminated on a part of a region of the gold plating layer and an alignment layer coated on the gold plating layer uncovered by the protection film;

liquid crystals interposed between the upper transparent electrode substrate and the lower FPCB electrode substrate, wherein the lower FPCB electrode substrate is an integrated type substrate for supplying an electrical signal to the plastic flat display, and wherein the alignment layer of the upper transparent electrode substrate and the alignment layer on the gold plating layer of the lower FPCB electrode substrate are aligned.

* * * * *